(12) United States Patent
Tamura

(10) Patent No.: US 12,184,593 B2
(45) Date of Patent: Dec. 31, 2024

(54) INFORMATION PROCESSING APPARATUS, METHOD, AND NON-TRANSITORY COMPUTER READABLE MEDIUM FOR CONTROLLING STORAGE CAPACITY OF CHAT ROOM BY EXTRACTING DELETION TARGET DOCUMENTS

(71) Applicant: FUJIFILM BUSINESS INNOVATION CORP., Tokyo (JP)

(72) Inventor: Yusuke Tamura, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 543 days.

(21) Appl. No.: 17/388,941

(22) Filed: Jul. 29, 2021

(65) Prior Publication Data

US 2022/0303233 A1 Sep. 22, 2022

(30) Foreign Application Priority Data

Mar. 19, 2021 (JP) .................................. 2021-045528

(51) Int. Cl.
*H04L 51/04* (2022.01)
*G06F 16/16* (2019.01)
*G06F 16/176* (2019.01)

(52) U.S. Cl.
CPC ............ *H04L 51/04* (2013.01); *G06F 16/162* (2019.01); *G06F 16/176* (2019.01)

(58) Field of Classification Search
CPC ....... H04L 51/04; H04L 51/42; G06F 16/162; G06F 16/176
See application file for complete search history.

(56) References Cited

U.S. PATENT DOCUMENTS

| | | | | |
|---|---|---|---|---|
| 8,666,961 B1* | 3/2014 | Qureshi | ................... | G06F 16/24 707/769 |
| 10,437,470 B1* | 10/2019 | Zhi | .......................... | G06F 3/067 |
| 2006/0161666 A1* | 7/2006 | Cohen | ..................... | H04L 51/04 726/4 |
| 2007/0124387 A1* | 5/2007 | Galloway | ............. | H04L 51/063 709/206 |
| 2008/0285731 A1* | 11/2008 | Mykhalchuk | ........... | H04L 51/04 379/88.14 |
| 2010/0017483 A1* | 1/2010 | Estrada | ................ | G06Q 10/107 709/206 |
| 2010/0267369 A1* | 10/2010 | Lim | ........................ | H04L 51/04 455/414.1 |
| 2015/0227514 A1* | 8/2015 | Gillett | ................. | G06F 16/9535 707/608 |
| 2015/0236990 A1* | 8/2015 | Shan | ...................... | H04L 51/046 709/206 |
| 2015/0264206 A1* | 9/2015 | Maeda | ............... | H04N 1/00509 358/1.13 |

(Continued)

FOREIGN PATENT DOCUMENTS

| | | |
|---|---|---|
| JP | 6723214 B2 | 7/2020 |
| JP | 6729590 B2 | 7/2020 |
| JP | 6737049 B2 | 8/2020 |

*Primary Examiner* — Javier O Guzman
(74) *Attorney, Agent, or Firm* — Oliff PLC

(57) ABSTRACT

An information processing apparatus includes: a processor configured to: in deleting documents associated with talks in a chat room, extract a deletion target document using attributes of the talks associated with the documents.

9 Claims, 11 Drawing Sheets

(56) References Cited

U.S. PATENT DOCUMENTS

| | | | |
|---|---|---|---|
| 2015/0365359 A1* | 12/2015 | Hasan | H04L 51/04 |
| | | | 709/206 |
| 2017/0046093 A1* | 2/2017 | Butt | G06F 3/0619 |
| 2017/0357421 A1* | 12/2017 | Dye | G11B 27/34 |
| 2017/0364528 A1* | 12/2017 | Hwang | G06N 20/00 |
| 2018/0004768 A1* | 1/2018 | Chen | G06F 7/00 |
| 2018/0165280 A1 | 6/2018 | Yi et al. | |
| 2018/0167451 A1 | 6/2018 | Yi et al. | |
| 2018/0351899 A1 | 12/2018 | Kano et al. | |
| 2022/0115018 A1* | 4/2022 | Desserrey | G10L 15/22 |

\* cited by examiner

FIG.6

| 605 | 610 | 615 | 620 | 625 | 630 |
|---|---|---|---|---|---|
| DOCUMENT ID | DOCUMENT NAME | CHAT ROOM ID | TALK ID | FILE SIZE | NUMBER OF ACCESSES |
| | | | | | |

600

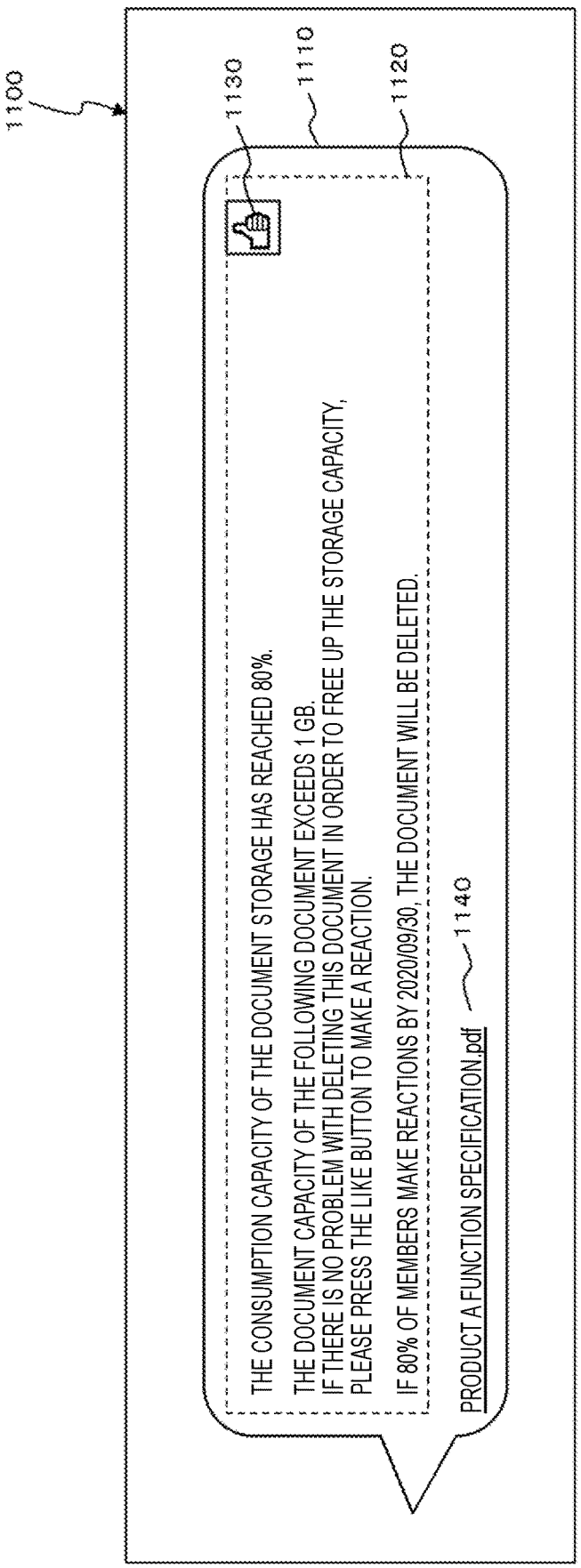

INFORMATION PROCESSING APPARATUS, METHOD, AND NON-TRANSITORY COMPUTER READABLE MEDIUM FOR CONTROLLING STORAGE CAPACITY OF CHAT ROOM BY EXTRACTING DELETION TARGET DOCUMENTS

CROSS-REFERENCE TO RELATED APPLICATIONS

This application is based on and claims priority under 35 USC 119 from Japanese Patent Application No. 2021-045528 filed Mar. 19, 2021.

BACKGROUND

(i) Technical Field

The present disclosure relates to an information processing apparatus, information processing method, and a non-transitory computer readable medium.

(ii) Related Art

Japanese Patent No. 6723214 discloses a conversation-based file sharing method executed by a computer. The method includes: receiving a file that is uploaded by an electronic device and is to be shared with at least one other device used by a user, through a conversation session set between the user's account of the electronic device and a server providing a cloud service; storing a shared message including a link of a storage location of the server in regard to the file uploaded to the server, as an instant message of a personal chat room corresponding to the conversation session; and displaying the shared message stored as the instant message, on a screen of the electronic device through the personal chat room. In the method, the other device is allowed to share the file uploaded to the server, via the shared message displayed in the personal chat room accessed by the user's account, and in the personal chat room, a shared message transmitted by the electronic device and a shared message transmitted by the other device are displayed similarly to messages transmitted by different senders.

Japanese Patent No. 6737049 discloses an information processing system in which plural terminal devices and an information processing apparatus share a file by using a message function within a group. The terminal device includes: an operation reception unit that receives a transmission operation of a file sharing message in which a file shared within a group and a destination user are specified, from a sending user; and a transmitter that transmits the file sharing message to the information processing apparatus. The information processing apparatus includes: a group information management unit that manages group information in which groups for which an approval by an approval user is required prior to file sharing are set; a file information management unit that manages file information in which an operation authority is set for a file shared within a group; and a processor. When a file sharing message for a group for which an approval by an approval user is required prior to file sharing is received from the terminal device, the processor sets the file information such that the file operation authority is given to not only the sending user of the file sharing message, and the approval user, but also the destination user belonging to the same organization as the sending user, until the approval is ended, and sets the file information such that the file operation authority is given to all users within the group after the approval is ended.

Japanese Patent No. 6729590 discloses a totalizer that aggregates intentions regarding approval or disapproval of each conversation participating member based on predetermined words included in input conversation contents, and an output controller that performs a control to output the total result obtained by the totalizer, and to output reminder information at the timing corresponding to a reply deadline-related word detected from analysis results of the input conversation contents.

SUMMARY

In a chat process of a chat system, documents are stored in association with talks. Since a storage capacity is limited, it is necessary to delete the stored documents. In such a case, a person in charge needs to check the documents to perform a deletion work. Aspects of non-limiting embodiments of the present disclosure relate to an information processing apparatus, an information processing method, and a non-transitory computer readable medium that can reduce the document deletion work to be performed by the person in charge as compared to a case in which, in deleting documents associated with talks in a chat room, the person in charge checks the documents to perform the deletion work.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: in deleting documents associated with talks in a chat room, extract a deletion target document using attributes of the talks associated with the documents.

BRIEF DESCRIPTION OF THE DRAWINGS

Exemplary embodiments of the present invention will be described in detail based on the following figures, wherein:

FIG. 6 is a view illustrating an example of a data structure of a document management table;

FIG. 11 is a view illustrating an example of processing by the exemplary embodiment.

DETAILED DESCRIPTION

Hereinafter, descriptions will be made on an example of an exemplary embodiment highly suitable for implementing the present disclosure with reference to the drawings.

Figure 1:
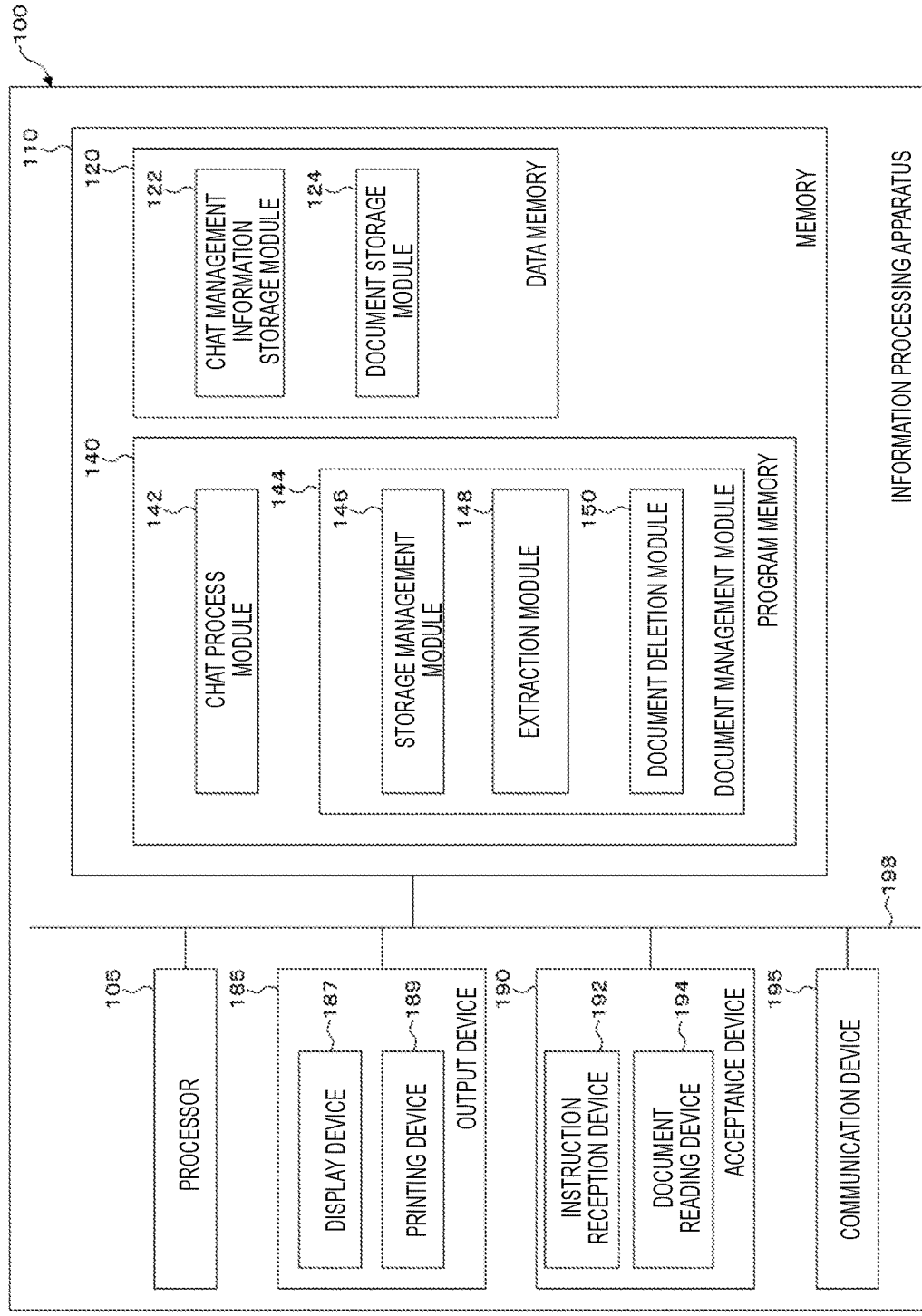
FIG. 1 is a conceptual module configuration diagram of a configuration example of an exemplary embodiment of the present disclosure.

FIG. 1 illustrates a conceptual module configuration diagram of a configuration example of the exemplary embodiment.

A module generally refers to a logically separable component such as software (including a computer program as an interpretation of "software") or hardware. Accordingly, the module in the exemplary embodiment refers to not only a module in the computer program, but also a module in a hardware configuration. Therefore, the exemplary embodiment also describes a computer program, a system, and a method which cause a computer to function as the module (for example, a program for causing a computer to execute each procedure, a program for causing a computer to function as each unit, and a program for causing a computer to implement each function). For the convenience of descriptions, the expressions "store", "caused to store", and equivalent expressions thereto will be used, and when the exemplary embodiment is a computer program, the expressions indicate storing data or the like in a storage device or performing a control to store data or the like in a storage device. In addition, one module may correspond to one function. In implementation, one module may be implemented by one program, plural modules may be implemented by one program, or conversely, one module may be implemented by plural programs. Further, plural modules may be executed by one computer, or one module may be executed by plural computers in a distributed or parallel environment. In addition, one module may include another module. Hereinafter, the term "connection" is used for a case of not only a physical connection, but also a logical connection (for example, a data exchange, an instruction, a reference relationship between data, and a login). The term "predetermined" indicates being determined prior to a target process, and includes the meaning of being determined according to a situation/state at or until a specific time point prior to the target process not only before a process by the present exemplary embodiment is started, but also even after the process by the present exemplary embodiment is started. When there are plural "predetermined values", the values may be different from each other, or two or more values (including any values) may be the same. The description "when it is A, B is performed" indicates that "it is determined whether it is A or not, and when it is determined that it is A, B is performed", except for a case where the determination of whether it is A or not is unnecessary. In addition, when items are enumerated like "A, B, and C", the enumeration is merely exemplary, and includes a case where only one (for example, only A) of the items is selected, unless otherwise specified.

In addition, a system or device includes not only a configuration where plural computers, hardware components, devices and the like are connected via a communication unit such as a network (including a one-to-one correspondence communication connection), but also a configuration implemented by one computer, one hardware component, one device and the like. The terms "device" and "system" are used to have the same meaning. The "system" does not include a system that merely means a social "structure" (that is, a social system) which is an artificial engagement.

In addition, target information is read from a storage device for each process performed by each module, or for each of plural processes performed by a single module. After the process is executed, the process result is written to the storage device. Thus, descriptions regarding the reading from the storage device prior to a process and the writing to the storage device after a process may be omitted.

An information processing apparatus 100 of the exemplary embodiment has a function of deleting a talk-related document in a chat process of a chat system. As illustrated in the example of FIG. 1, the information processing apparatus 100 includes at least a processor 105, and memory 110, and a bus 198 that connects the components to each other so as to exchange data. In addition, the information processing apparatus 100 may include an output device 185, a reception device 190, and a communication device 195. Then, via the bus 198, data exchange is performed among the processor 105, the memory 110, the output device 185, the reception device 190, and the communication device 195.

A "chat" is a service for exchanging talks (also called messages) between users, and includes message processing in a social networking service (SNS). Then, in this chat, a document may be included in talks. That is, the document may be shared and viewed by users as members of a chat room (chat members).

The block diagram illustrated in the example of FIG. 1 also illustrates a hardware configuration example of a computer that implements the exemplary embodiment. The hardware configuration of the computer on which a program according to the exemplary embodiment is executed corresponds to a computer exemplified in FIG. 1, specifically, a personal computer, a computer that can become a server, or the like. As a specific example, the processor 105 is used as a processor, and the memory 110 is used as a storage device.

There may be one processor 105 or plural processors 105. The processor 105 includes, for example, a central processing unit (CPU), a microprocessor or the like. When the plural processors 105 are used, any of forms including a tightly coupled multiprocessor, and a loosely coupled multiprocessor may be employed. For example, plural processor cores may be mounted in one processor 105. Plural computers may be connected by a communication path to constitute a system that virtually behaves as if it is one computer. As a specific example, as the loosely coupled multiprocessor, a configuration as a cluster system or a computer cluster may be made. The processor 105 executes a program in a program memory 140.

The memory 110 may include, for example, a semiconductor memory inside the processor 105, such as a register or a cache memory, may be a main memory as a main storage device configured with a random access memory (RAM), a read only memory (ROM) or the like, may be an internal storage device having a function as a persistent storage device, such as a hard disk drive (HDD) or a solid state drive (SSD), or an external storage device or an auxiliary storage device such as a CD, a DVD, a Blu-ray (registered trademark) disc, a USB memory, or a memory card, or may include a storage device connected via a communication line, such as a server.

The memory 110 includes a data memory 120 that mainly stores data and the program memory 140 that mainly stores a program. In the data memory 120 and the program memory 140, not only the illustrated information, and module programs, but also a program for booting up the computer, such as an OS, and data such as parameters that suitably change in the module execution may be stored.

The output device 185 includes, for example, a display device 187, a printing device 189 and the like. The display device 187, which is a liquid crystal display, an organic EL display, a three-dimensional display, a projector or the like, displays the result of processing by the processor 105, data within the data memory 120, and the like, as a text, image information, or the like. The printing device 189, which is a printer, a multifunction device or the like, prints the result of processing by the processor 105, data within the data memory 120, and the like. The output device 185 may include a speaker, an actuator that vibrates an apparatus, or the like.

The reception device 190 includes, for example, an instruction reception device 192, a document reading device 194 and the like. The instruction reception device 192, which is a keyboard, a mouse, a microphone, a camera (including a gaze tracking camera or the like) or the like, receives data based on a user operation on the device (including a motion, a voice, a gaze, etc.).

Also, there may be, for example, a touch screen having functions of both the display device 187 and the instruction reception device 192. In this case, even when there are no physical keys for implementing a keyboard function, a keyboard (also so-called a software keyboard, a screen keyboard or the like) may be drawn on the touch screen by software so that the keyboard function may be implemented.

As a user interface, the display device 187 and the instruction reception device 192 are mainly used.

The document reading device 194, which is a scanner, a camera or the like, receives image data generated when a document is read or an image of a document is captured.

The communication device 195 is a communication line interface such as a network card, which is used for connection to another device via a communication line.

Of the exemplary embodiments, an exemplary embodiment related to a computer program is implemented in the manner that the computer program which is software is read into the program memory 140 which is a hardware component of the present disclosure, and software and hardware resources cooperate with each other. That is, the present exemplary embodiment is specifically implemented in the manner that information processing by software uses hardware resources (including at least the processor 105, and the memory 110, and in some cases, the output device 185, the reception device 190, and the communication device 195), and uses the law of nature as a whole.

The hardware configuration illustrated in FIG. 1 is merely an example, and the exemplary embodiment is not limited to the configuration illustrated in FIG. 1 as long as the modules described in the exemplary embodiment are executable. For example, a graphics processing unit (GPU; including general-purpose computing on graphics processing units (GPGPU)) may be used as the processor 105. The execution of some modules may be configured with dedicated hardware (for example, an integrated circuit for a specific use (specific examples include an application specific integrated circuit (ASIC)) or a reconfigurable integrated circuit (specific examples include a field-programmable gate array (FPGA)). A mode in which some modules are present in the external system and are connected via a communication line may be employed, and plural systems illustrated in FIG. 1 may be connected to each other through a communication line so as to cooperate with each other. In particular, the configuration may be incorporated into a portable information communication device (including a cellular phone, a smartphone, a mobile device, a wearable computer and the like), information appliances, a robot, a copier, a facsimile, a scanner, a printer, a multifunction device (an image processing device having two or more functions of a scanner, a printer, a copier, a facsimile and the like) or the like as well as the server, and the personal computer.

The processor 105 is connected to the memory 110, the output device 185, the reception device 190, and the communication device 195 via the bus 198. The processor 105 executes processing according to a program within the program memory 140, that is a computer program that describes an execution sequence of each module. For example, when a user operation is received by the instruction reception device 192, processing by a module corresponding to the operation within the program memory 140 is executed, and the processing result is stored in the data memory 120, is output to the display device 187, or is transmitted to another device through control of the communication device 195.

The data memory 120 includes a chat management information storage module 122, and a document storage module 124.

The chat management information storage module 122 stores information related to chatting. The information related to chatting includes a chat room, chat users who make up the chat room, a talk, a reply talk, a reaction, a date and time when the talk or the like (specifically, the talk, the reply talk, or the reaction) was performed, a user who performed the talk, or the like, and the like. The information stored by the chat management information storage module 122 includes, for example, a chat room management table 400, a talk management table 500, a deletion candidate document management table 800, etc., which will be described below by using FIGS. 4, 5, and 8.

The document storage module 124 stores information about a document. The information about the document includes the document itself, the attributes of the document, and the like. The attributes of the document include a document name, a document capacity (a document size), a creation date and time, an update date and time, a creator, the number of times the document was accessed, a date and time when the document was posted to the chat, and the like. The document (also called a file) is text data, numerical data, figure data, image data, video data, audio data, etc., or a combination thereof, which refers to those which become targets of storage, editing, searching, etc., and may be exchanged as individual units between systems or users, and includes things similar to these. Specifically, the document includes a document created by a document creation program (so-called word processor software), an image read by an image reading device (a scanner or the like), a Web page and the like. The information stored by the document storage module 124 includes, for example, a document management table 600, etc., which will be described below by using FIG. 6.

The program memory 140 stores a chat process module 142, and a document management module 144.

The chat process module 142 performs a chat process. That is, the chat process module 142 receives and executes requests such as posting of a talk on a chat room, reactions, and the like. Specifically, the chat process module 142 performs processing such as generation of a chat room, management of chat users, notification and displaying of talks, reactions, etc., in the chat room, and control of a chatbot. The contents of a talk are generally based on a text. Alternatively, the contents of a talk may be an audio, an image, a video, etc. Further, a document may be associated with the talk. Here, the association of the document with the talk indicates a state where the document is attached to the talk, and a user who sees the talk may view the document. The document is stored in the document storage module 124.

The document management module 144 includes a storage management module 146, an extraction module 148, and a document deletion module 150.

The storage management module 146 manages a storage allocated to a chat room. The chat management information storage module 122, and the document storage module 124 are stored in the storage. Here, the storage allocated to the chat room has an upper limit storage capacity. That is, when there are many documents associated with talks, the upper limit storage capacity may be reached, and the documents may need to be deleted in some cases. Thus, the extraction module 148, and the document deletion module 150 perform a control to delete documents.

In deleting documents associated with talks in a chat room, the extraction module 148 extracts a document as a deletion target using attributes of the talks associated with the documents.

After "the deletion target document is extracted", as described later, chat members may be asked as of whether the members want to delete the document, or the document may be deleted without such an inquiry.

The document deletion module 150 may notify the chat room of a talk to ask whether to agree to delete the extracted deletion target document, and delete the deletion target document according to responses to the talk from users in the chat room. The detailed processing contents will be described below by using the example of FIGS. 10 and 11.

"Notifying the chat room of a talk to ask whether to agree to delete" may be performed by a chatbot registered in the chat room, or may be performed by a chat system itself. The chatbot is a computer that makes conversation on behalf of a human, and may be treated as one chat user in some cases. The contents of the talk in the notification made by the chatbot may be generated by the exemplary embodiment, or may be generated by artificial intelligence.

Conditions for "the document is deleted according to the responses from the users" include (i) a case where the number of responses, from the users, indicating that they agree to deletion is equal to or greater than a predetermined number, and (ii) a case where the ratio of responses, from the users, indicating that they agree to deletion (a ratio of the number of users who made responses indicating that they agree to deletion to the total number of users in the chat room) is equal to or greater than a predetermined value.

Further, the document deletion module 150 may use selections of a response icon provided in the chat room, as the responses from the users.

Here, "response icons provided in the chat room" are response icons in the chat room in a state before the exemplary embodiment is introduced. That is, in regard to the talk having contents of "Do you want to delete a certain document?", existing response icons are used for "manifestation of intention to agree to deletion" and "manifestation of intention to disagree to deletion". Hereinafter, selecting a response icon by a chat user is also referred to as a reaction. For example, in some cases, response icons such as "like", "wonderful", "laughter", "surprise", "sad", and "angry" may be set in advance (a case where these are provided as a function of the chat system itself). Among the response icons, a response icon indicating agreement to deletion, and a response icon indicating disagreement to deletion may be allocated. Plural response icons may be allocated, or one response icon may be allocated for each. In the former example, as a response icon indicating that agreement to deletion, response icons of "like", "wonderful", and "laughter" may be allocated, and as a response icon indicating that disagreement to deletion, response icons of "surprise", "sad", and "angry" may be allocated. In the later example, as a response icon indicating agreement to deletion, only a response icon of "like" may be allocated, and as a response icon indicating disagreement to deletion, only a response icon of "angry" may be allocated. Further, one response icon may be allocated to one, and plural response icons may be allocated to the other.

In deleting the documents associated with the talks in the chat room, the extraction module 148 may extract first-stage deletion target documents using the attributes of the documents.

Then, as described above, the extraction module 148 may perform processing of extracting the deletion target document, using the attributes of the talks, from among the first-stage deletion target documents. That is, through this processing, a second-stage deletion target document is extracted. The detailed processing contents will be described below by using the example of FIG. 7.

Here, "the attributes of the document" in the first stage include, for example, a document capacity, the number of times the document was accessed, a date and time when the document was posted to the chat, and the like. In "using the attributes of the document", for example, it is checked if the capacity of the document is equal to or larger than a predetermined threshold value, the document is included in predetermined top-priority documents when documents are sorted by a document capacity in the descending order and prioritized, the number of times of access to the document is equal to or less than a predetermined threshold value, a predetermined period has passed from the date and time when the document was posted to the chat, and the like. When these conditions are satisfied, the document is set as the deletion target. Any one of these conditions or a combination of two or more may be used.

In deleting the document associated with the talk in the chat room, the storage management module 146 may extract first-stage deletion target documents when a storage capacity allocated to the chat room and a currently used capacity satisfy a predetermined condition. The detailed processing contents will be described below by using the example of FIG. 3.

The "predetermined condition" is, for example, that (the currently used capacity)/(the storage capacity allocated to the chat room) is equal to or greater than a threshold value A.

Specifically, (1) determining whether the storage capacity allocated to the chat room and the currently used capacity satisfy a predetermined condition, (2) extracting deletion target documents by using attributes of the document, and (3) extracting a deletion target document by using attributes of the talk again among the documents extracted in (2) are performed.

By firstly performing the processing (2) of checking whether to delete the document and then performing the processing (3), unnecessary processing using the talk attributes may be skipped. The processing (3) requires a larger throughput than the processing (2).

Further, the extraction module 148 may use, as the attribute of each talk, any one of conditions including (1) the number of reply talks made for the talk, (2) the number of participants in talks including replies made for the talk, and (3) the number of reactions made for the talk, or a combination of two or more of the conditions. The detailed processing contents will be described later by using the example of FIG. 9.

Here, in a reply talk, both an original talk, and a user's reply (response) to the original talk are transmitted. Specifically, a combination including the user name of the other party, the past talk of the other party, and the user's own talk as a reply to the talk is displayed on a chat screen. The number of participants in the target talk may be the number of users who made replies to the talk, may be the number of users of chatting performed within a predetermined period from the date and time when the talk was made, or may be the number of users of talks determined to be reply talks for the talk by an artificial intelligence model. This artificial intelligence model is obtained through machine learning using a combination of a talk A and a talk B as a reply to the talk A (in general, plural talks B), as training data.

Conditions using those talk attributes are (1) a condition that the number of reply talks is equal to or less than a predetermined threshold value, (2) a condition that the number of participants is equal to or less than a predetermined threshold value, and (3) a condition that the number of reactions is equal to or less than a predetermined threshold value, respectively.

Then, when the combination of the two or more conditions is used as the attributes of each talk and all of the conditions are satisfied, the document deletion module 150 may delete the documents without inquiring users in the chat room. This inquiry is notifying the chat room of the talk to ask whether to agree to delete the extracted deletion target document and requesting the users in the chat room to make responses to the notified talk.

The combination of two or more conditions is a logical product (AND) condition. For example, when the two or more conditions "the number of reply talks made for the talk is less than a threshold value", and "the number of participants in talks including replies made for the talk is less than a threshold value" are satisfied, the document may be deleted without inquiring of chat members.

When only one condition is satisfied, a talk to ask whether to agree to delete the document is notified to the chat room. Then, when the number of positive responses to the talk from chat room members (indicating agreement to deletion, for example, "like") is equal to or greater than a threshold value, the target document is deleted.

Further, when two or more conditions are satisfied, the document may not be directly deleted. Instead, the above described threshold value to be compared with the number of responses from the chat room members may be a value different from the threshold value in a case where only one condition is satisfied. Specifically, since a threshold value becomes lower than the threshold value in a case where only one condition is satisfied, the target document may be deleted with a small number of positive responses. That is, even when responses are obtained, deletion conditions are loosened.

Figure 2:
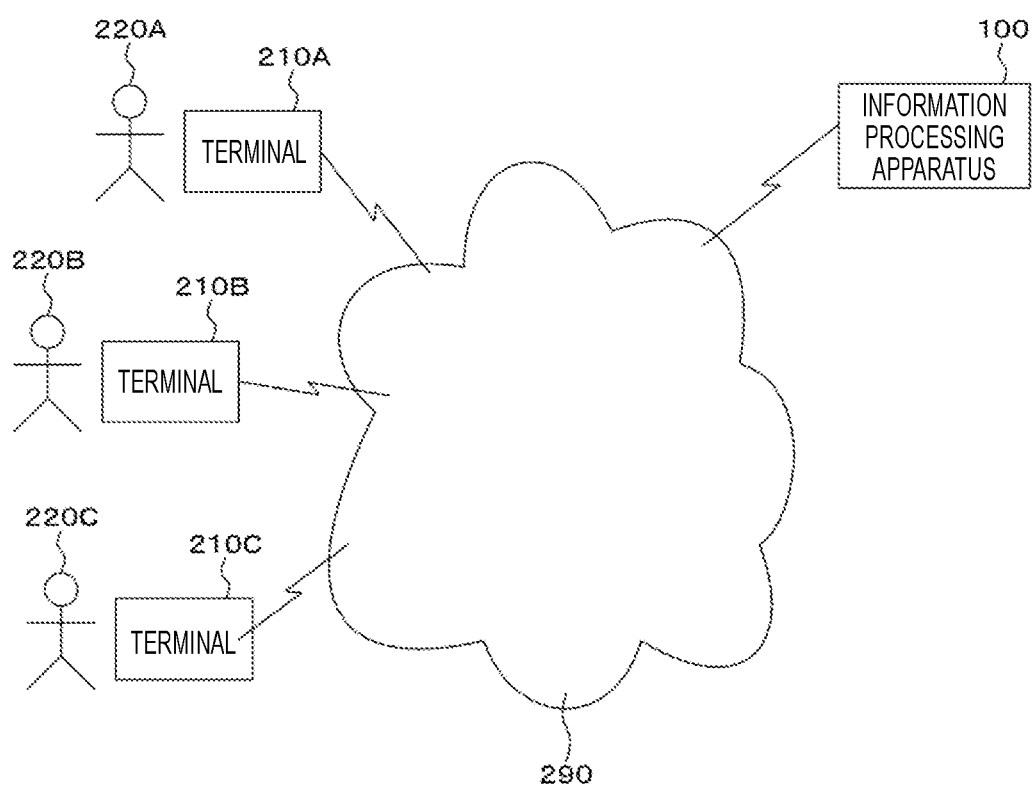
FIG. 2 is a view illustrating an example of a system configuration using the exemplary embodiment.

FIG. 2 is a view illustrating an example of a system configuration using the exemplary embodiment.

The information processing apparatus 100, a terminal 210A, a terminal 210B, and a terminal 210C are individually connected via a communication line 290. The communication line 290 may be wireless or wired, or may have a combination of these, and may be, for example, the Internet, intranet, or the like as a communication infrastructure. The function by the information processing apparatus 100 may be implemented as a cloud service. The terminal 210 is a terminal that may be used by a user 220, and is able to communicate with the information processing apparatus 100. Examples of the terminal 210 include a personal computer (including a notebook PC), a mobile information communication device, etc.

Each user 220 possesses each terminal 210. The user 220A, the user 220B, and the user 220C access the information processing apparatus 100 by using the respective terminals 210, and use a chat service of the information processing apparatus 100. The user 220A, the user 220B, and the user 220C are users in the same chat room, and may post talks attached with documents.

Before the exemplary embodiment is introduced, when the capacity of a storage associated with a chat room becomes almost full, document contents have to be minutely examined and unnecessary documents need to be manually extracted and deleted. In particular, in a chat service, since plural people post documents in association with talks (that is, documents are uploaded to the information processing apparatus 100), it is difficult for an individual to determine whether a document may be deleted.

An example of processing by the information processing apparatus 100 of the exemplary embodiment will be described. This description is intended to facilitate the understanding of the exemplary embodiment, and limited interpretation using this description is not intended. Further, by using only this description part, the disclosure to be patented should not be determined to be that described in the detailed description of the disclosure.

The information processing apparatus 100 automatically detects a document that is determined to be unnecessary from attributes of the document and attributes of a talk associated with the document. For example, the information processing apparatus 100 detects a document for which the number of accesses is small, and a document whose capacity is excessively large as compared to other documents.

The information processing apparatus 100 posts a talk and notifies a chat room of the detected candidate document as a deletion target, and waits for reactions of users. A reaction indicating agreement to deletion is performed by clicking a "like" button in regard to the post. When the number of positive reactions obtained within a predetermined period from the users within the chat room is equal to or greater than a certain number, the file is deleted.

Figure 3:
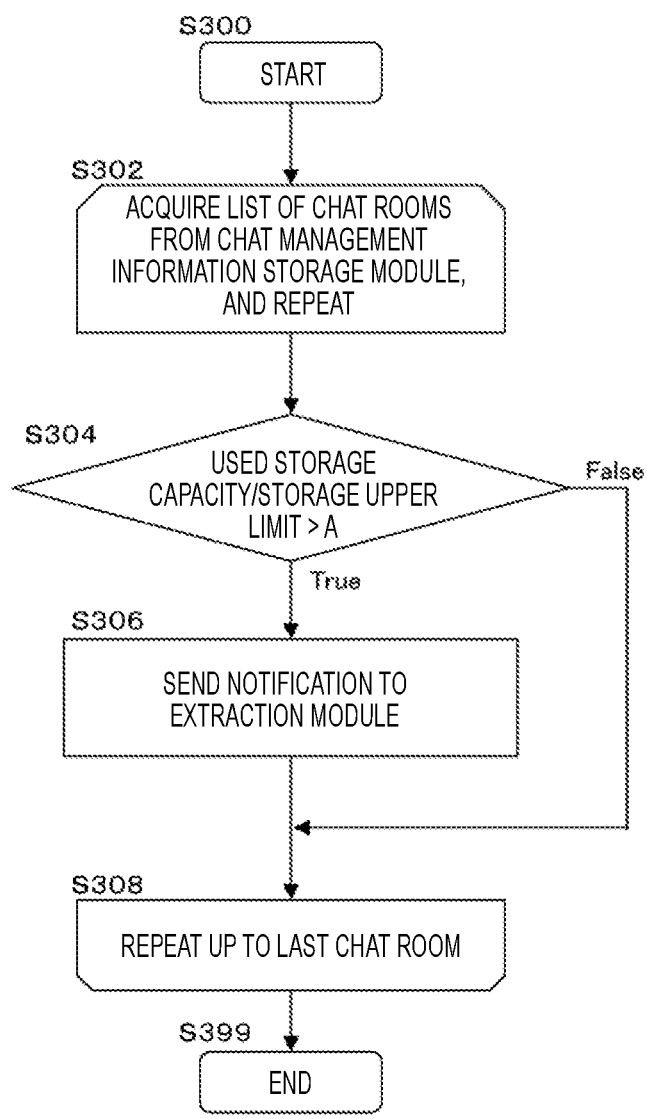
FIG. 3 is a flowchart illustrating an example of processing by the exemplary embodiment (a storage management module)

FIG. 3 is a flowchart illustrating an example of processing by the exemplary embodiment (the storage management module 146). This relates to processing of monitoring a used capacity of a storage. This processing is periodically performed by the storage management module 146, for example, once a day. A request of a chat user may be received so that processing in step S304, and step S306 may be performed on a chat room to which the chat user belongs.

Figure 4:
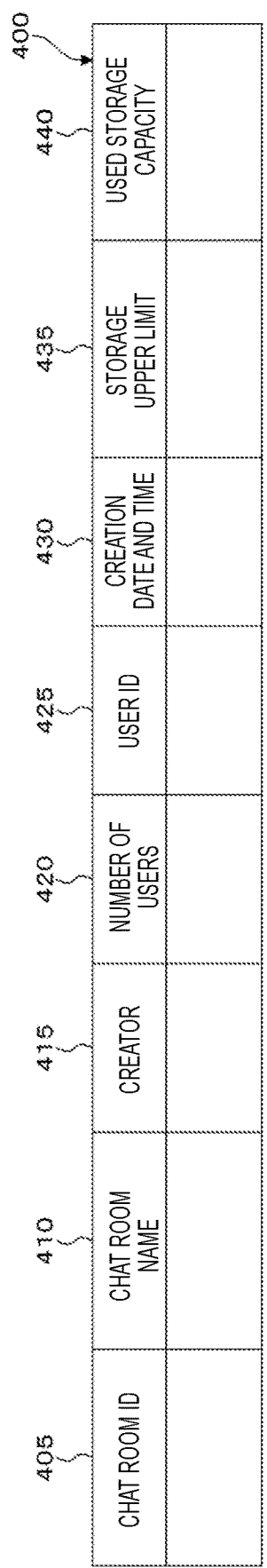
FIG. 4 is a view illustrating an example of a data structure of a chat room management table.

In step S302, a list of chat rooms is acquired from the chat management information storage module 122, and then, processing is repeatedly performed up to step S308. For example, the chat room management table 400 is used as the list of chat rooms. FIG. 4 is a view illustrating an example of a data structure of the chat room management table 400. The chat room management table 400 is stored in the chat management information storage module 122. The chat room management table 400 includes a chat room ID column 405, a chat room name column 410, a creator column 415, a number of users column 420, a user ID column 425, a creation date and time column 430, a storage upper limit column 435, and a used capacity column 440. In the exemplary embodiment, the chat room ID column 405 stores information for uniquely identifying a chat room (specifically, a chat room identifier (ID)). The chat room name column 410 stores a name of the chat room. The creator column 415 stores a creator of the chat room. The number of users column 420 stores the number of users belonging to the chat room. The user ID column 425 stores information for uniquely identifying a user (specifically, a user ID), in the exemplary embodiment. The user IDs are stored such that the number of stored user IDs is equal to the number of users in the number of users column 420. The creation date and time column 430 stores a date and time when the chat room was created (year, month, day, hour, minute, sec, millisecond or less, or a combination thereof may be used). The storage upper limit column 435 stores the upper limit capacity of a storage allocated to the chat room. The used capacity column 440 stores a currently used capacity of the storage.

In step S304, it is determined whether "used capacity/storage upper limit >A" is satisfied. When it is determined that "used capacity/storage upper limit >A" is satisfied, the process proceeds to step S306; otherwise, the process proceeds to step S308. That is, the ratio of a currently used capacity of the storage of a target chat room to a capacity of the storage allocated to the chat room is calculated. Then, when the ratio is larger than the predetermined threshold value A (when the storage is nearly full), a deletion target document is extracted. When the ratio is equal to or less than the threshold value A, document deletion processing in the chat room is unnecessary. The threshold value A is a value freely selected, and may be, for example, 0.8.

Specifically, this determination processing may be performed using the contents of the storage upper limit column 435 and the contents of the used capacity column 440 in the chat room management table 400.

In step S306, a notification is given to the extraction module 148. The extraction module 148 performs processing according to a flowchart illustrated in an example of FIG. 7. At this time, a target chat room ID is passed to the extraction module 148.

In step S308, processing in steps S302 to S306 is repeatedly performed up to the last chat room.

Figure 5:
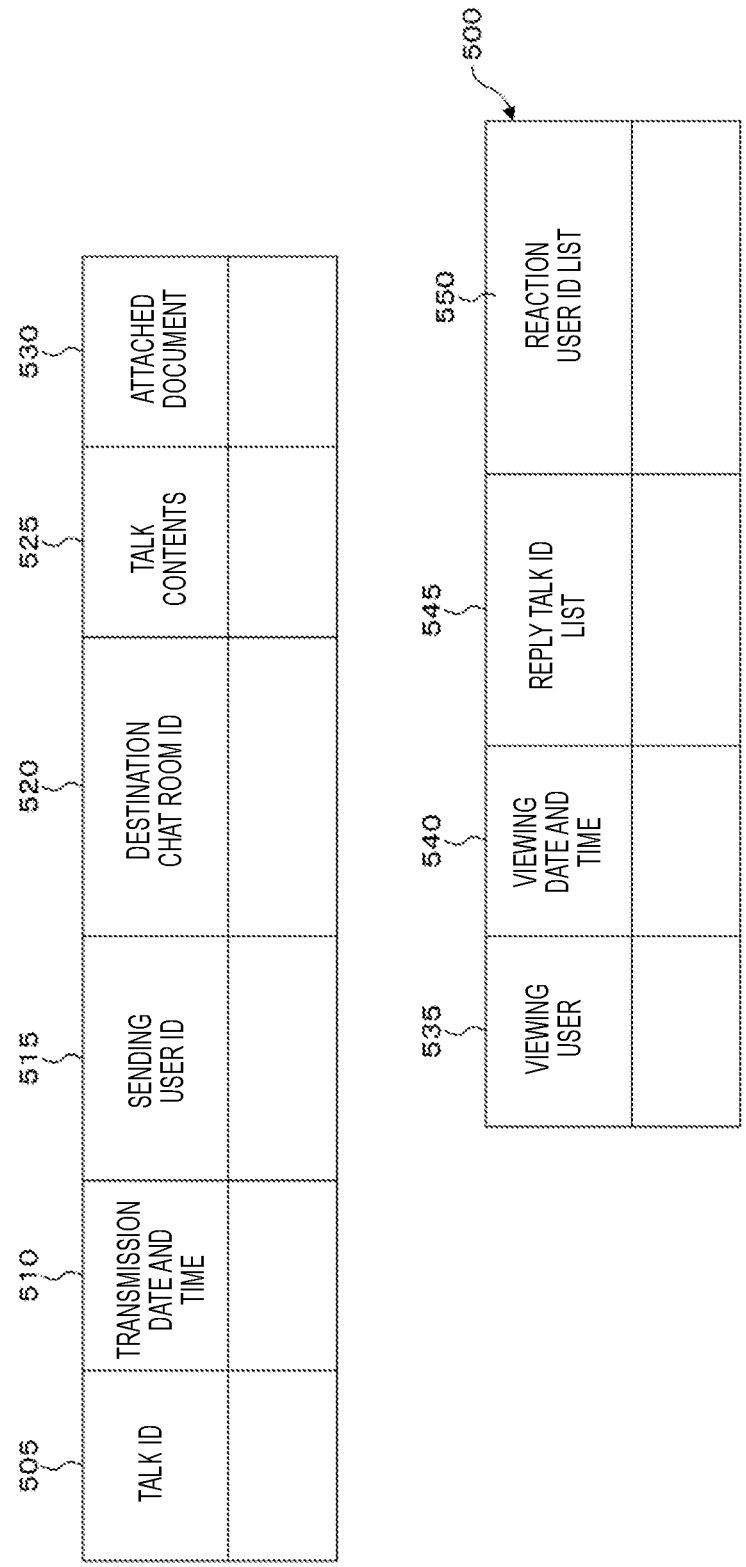
FIG. 5 is a view illustrating an example of a data structure of a talk management table.

FIG. 5 is a view illustrating an example of a data structure of the talk management table 500. The talk management table 500 is stored in the chat management information storage module 122. The talk management table 500 includes a talk ID column 505, a transmission date and time column 510, a sending user ID column 515, a destination chat room ID column 520, a talk contents column 525, an attached document column 530, a viewing user column 535, a viewing date and time column 540, a reply talk ID list column 545, and a reaction user ID list column 550. In the exemplary embodiment, the talk ID column 505 stores information for uniquely identifying a talk (specifically, a talk ID). The transmission date and time column 510 stores a date and time when the talk was transmitted. The sending user ID column 515 stores a user ID of a user who sent the talk. The destination chat room ID column 520 stores a chat room ID of a chat room to which the talk was transmitted (in other words, a destination chat room). The talk contents column 525 stores contents of the talk. The attached document column 530 stores a document attached to the talk. The attached document column 530 may store the document itself, or may store a location where the document is stored (a directory, a uniform resource locator (URL), etc.). The viewing user column 535 stores a user ID of a user who viewed the talk. The viewing date and time column 540 stores a date and time when the talk was viewed. A combination of the viewing user column 535 and the viewing date and time column 540 is repeated as many times as the number of users of the chat room. The reply talk ID list column 545 stores a list of reply talk IDs of reply talks for the talk. The talk ID may be used as the reply talk ID. The reaction user ID list column 550 stores a list of user IDs of users who made reactions for the talk. The reaction user ID list columns 550 are prepared such that the number of the reaction user ID list columns 550 is equal to the number of types of reactions, and for each reaction, a user ID of a user who made the reaction is stored.

Figure 6:
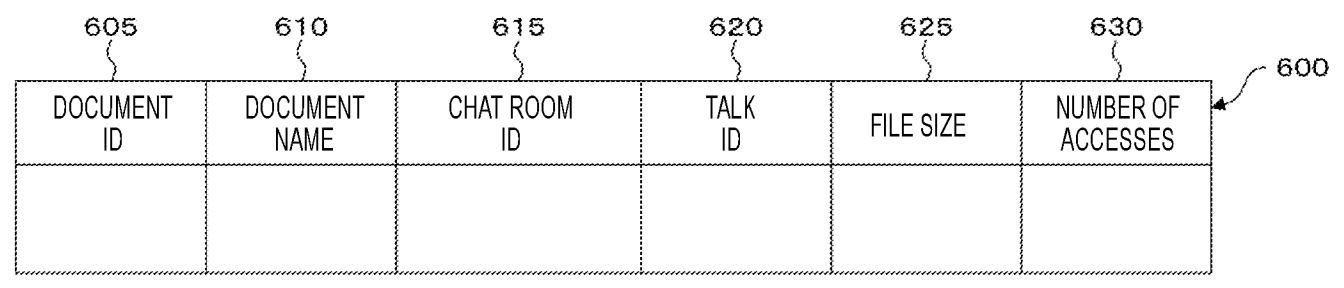

FIG. 6 is a view illustrating an example of a data structure of the document management table 600. The document management table 600 is stored in the document storage module 124. The document management table 600 includes a document ID column 605, a document name column 610, a chat room ID column 615, a talk ID column 620, a file size column 625, and a number of accesses column 630. In the exemplary embodiment, the document ID column 605 stores information for uniquely identifying a document (specifically, a document ID). The document name column 610 stores a name of the document. The chat room ID column 615 stores a chat room ID of a chat room where the document was stored. The talk ID column 620 stores a talk ID of a talk associated with the document. The file capacity column 625 stores a file size of the document. The number of accesses column 630 stores the number of accesses of the document (the number of times a document has been viewed).

Figure 7:
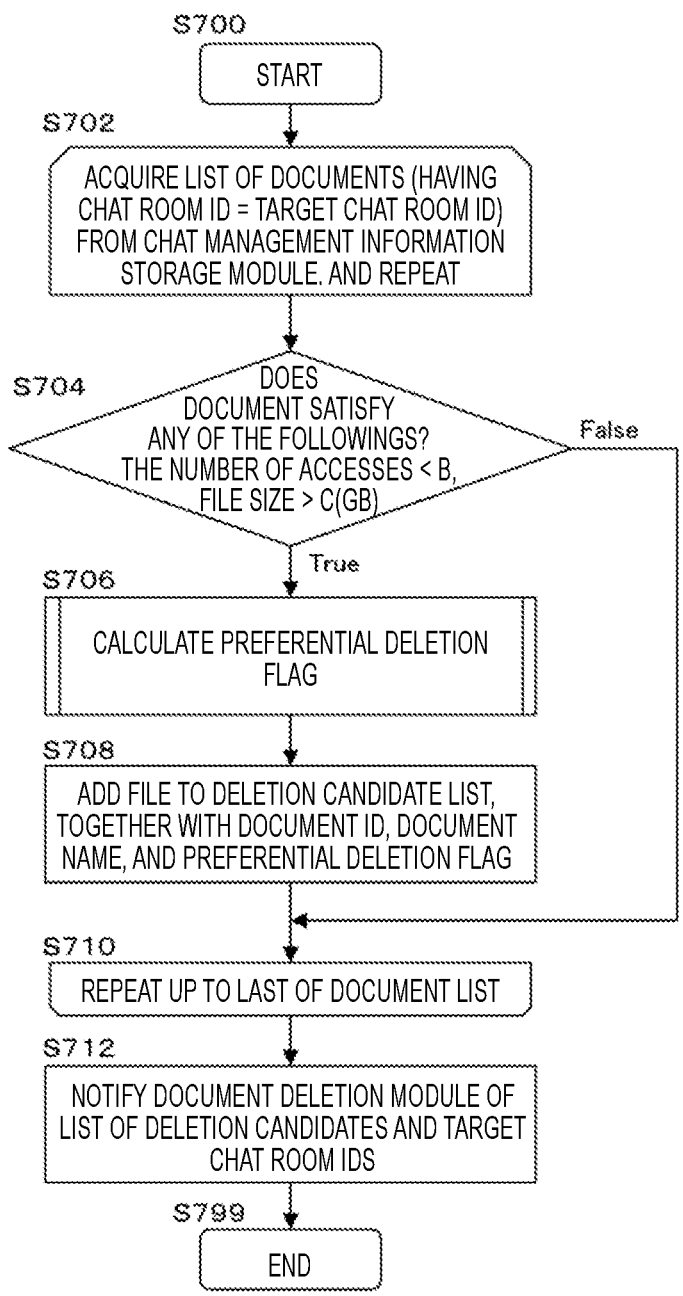
FIG. 7 is a flowchart illustrating an example of processing by the exemplary embodiment (an extraction module)

FIG. 7 is a flowchart illustrating an example of processing by the exemplary embodiment (the extraction module 148). Upon reception of the notification from the storage management module 146, the extraction module 148 performs this processing.

In step S702, a list of documents having "a chat room ID=a target chat room ID" is acquired from the chat management information storage module 122, and then, processing is repeatedly performed up to step S710. Specifically, a document for which the chat room ID in the chat room ID column 615 of the document management table 600 is the same as the target chat room ID passed from the storage management module 146 may be extracted.

In step S704, it is determined whether the document satisfies either "the number of accesses <B" or "a file size >C (GB)". When it is determined that the document sanctifies either of the conditions, the process proceeds to step S706; otherwise, the process proceeds to step S710. Specifically, the number of accesses in the number of accesses column 630 of the document management table 600 and the file size in the file size column 625 may be used. The threshold value B is a value freely selected, and may be, for example, 10. The threshold value C is a value freely selected, and may be, for example, 1. Here, the number of accesses may be the number of times the target document was viewed, or may be the number of users who viewed the document. In the former case, when one user accessed the document plural times, the number of accesses increased correspondingly, whereas in the latter case, even when one user accessed the document plural times, the number of accesses by the user is still 1.

In step S704, it is determined whether either the condition "the number of accesses <B" or the condition "file size >C (GB)" is satisfied. Alternatively, it may be determined whether both conditions are satisfied. For example, determinations may be made separately such that when "the used capacity/the storage upper limit" calculated in step S304 in the flowchart illustrated in FIG. 3 is equal to or less than a threshold value A1, it is determined whether both conditions are satisfied, whereas when "the used capacity/the storage upper limit" is larger than the threshold value A1, it is determined whether either of the conditions is satisfied. The threshold value A1 is larger than the threshold value A. For example, when the threshold value A is 0.8, the threshold value A1 is set to 0.9. That is, when the storage is nearly full (when the ratio is larger than the threshold value A1), conditions are loosened so as to increase the number of deletion candidate documents, whereas when the storage is not nearly full to some extent (when the ratio is larger than the threshold value A, but is equal to or less than the threshold value A1), conditions are tightened so as to reduce the number of deletion candidate documents.

In step S706, a preferential deletion flag is calculated. The detailed processing of step S706 will be described later with reference to a flowchart illustrated in an example of FIG. 9.

Figure 8:
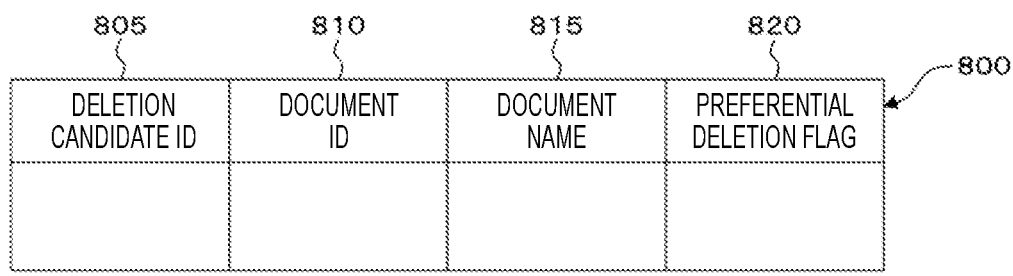
FIG. 8 is a view illustrating an example of a data structure of a deletion candidate document management table.

In step S708, a file is added to a list of deletion candidates, together with a document ID, a document name, and the preferential deletion flag. For example, the deletion candidate document management table 800 is used. FIG. 8 is a view illustrating an example of a data structure of the deletion candidate document management table 800. The deletion candidate document management table 800 is stored in the chat management information storage module 122. The deletion candidate document management table 800 includes a deletion candidate ID column 805, a document ID column 810, a document name column 815, and a preferential deletion flag column 820. In the exemplary embodiment, the deletion candidate ID column 805 stores information for uniquely identifying a deletion candidate (specifically, a deletion candidate ID). The document ID column 810 stores a document ID of a document that is the deletion candidate. The document name column 815 stores a name of the document. The preferential deletion flag column 820 stores a preferential deletion flag for the deletion candidate.

In step S710, processing in steps S702 to S708 is repeatedly performed up to the last of the document list.

In step S712, the document deletion module 150 is notified of the list of deletion candidates and target chat room IDs.

Figure 9:
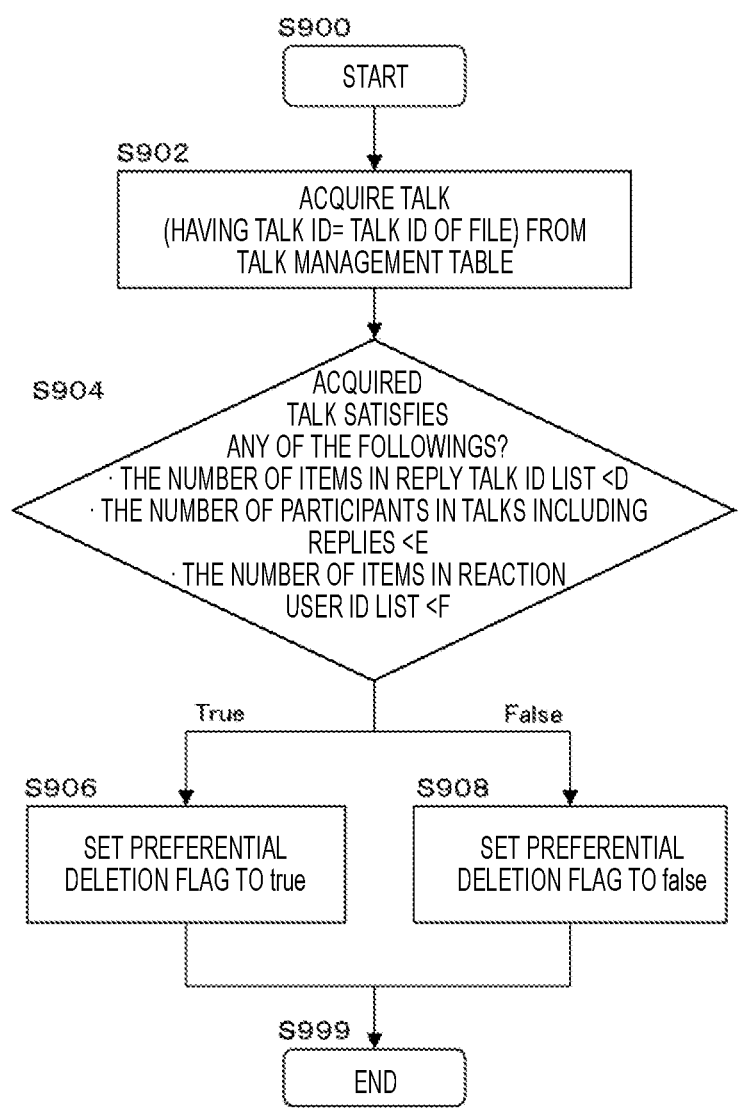
FIG. 9 is a flowchart illustrating an example of processing by the exemplary embodiment (the extraction module)

FIG. 9 is a flowchart illustrating an example of processing by the exemplary embodiment (the extraction module 148). In this processing, a preferential deletion flag is calculated.

In step S902, a talk having "a talk ID=a talk ID of a file" is acquired from the talk management table 500. Specifically, a talk ID in the talk ID column 505 of the talk management table 500 which is the same as a talk ID in the talk ID column 620 of the document management table 600 is extracted.

In step S904, it is determined whether the acquired talk satisfies any one of "the number of items in the reply talk ID list <D", "the number of participants in talks including replies <E", and "the number of items in the reaction user ID list <F". When any one of the conditions is satisfied, the process proceeds to step S906; otherwise, the process proceeds to step S908. The threshold value D is a value freely selected, and may be, for example, 5. The threshold value E is a value freely selected, and may be, for example, 5. The threshold value F is a value freely selected, and may be, for example, 5.

The "number of participants in talks including replies" is obtained by acquiring user IDs of users who sent replies from the reply talk ID list (values in the reply talk ID list column 545 of the talk management table 500) and counting unique user IDs including a user ID of a user who sent an original talk (do not cumulatively count duplicate user IDs, but count the duplicate user IDs as one unique user ID).

In step S906, the preferential deletion flag is set to "true".

In step S908, the preferential deletion flag is set to "false".

In step S904, it is determined whether the acquired talk satisfies any one of the condition D "the number of items in the reply talk ID list <D", the condition E "the number of participants in talks including replies <E", and the condition F "the number of items in the reaction user ID list <F". Alternatively, a combination of two or more of the conditions may be used. For example, the condition D and the condition E may be used, the condition D and the condition F may be used, the condition E and the condition F may be used, or the condition D, the condition E, and the condition F may be used.

In step S904, when any one of the three conditions is satisfied, the preferential deletion flag is set to "true". Alternatively, when two or more of the conditions are satisfied, the preferential deletion flag may be set to "true (A)"; when one of the conditions is satisfied, the preferential deletion flag may be set to "true (B)"; and when none of the conditions is satisfied, the preferential deletion flag may be set to "false". Then, when the preferential deletion flag is "true (B)", the processing according to a flowchart illustrated in an example of FIG. 10 may be performed, and when the preferential deletion flag is "true (A)", the target document may be deleted without performing the processing according to the flowchart illustrated in the example of FIG. 10, that is, without requiring responses from users in the chat room. Further alternatively, when three or more of the conditions are satisfied, the preferential deletion flag may be set to "true (A)"; when two of the conditions or one of the conditions is satisfied, the preferential deletion flag may be set to "true (B)"; and when none of the conditions is satisfied, the preferential deletion flag may be set to "false". When the priority deletion flag is "true (A)" or "true (B)", the document deletion processing is the same as described above.

In step S904, "the number of items in the reply talk ID list", "the number of participants in talks including replies", and "the number of items in the reaction user ID list" are used. In regard to the talk, instead of the preferential deletion flag, these values ("the number of items in the reply talk ID list", "the number of participants in talks including replies", and "the number of items in the reaction user ID list") may be recorded, and these values may be added up and then may be used as a score indicating the deletion priority. In a case where the scores are used instead of the preferential deletion flag, the scores may be sorted in the ascending order to present a deletion candidate document (that is, a document with a lower score is to be preferentially deleted), or to present a determination reason for the priority. Accordingly, based on more information, a user may determine whether to make deletion. The number of items to be checked by the user increases, which increases the cost at the time of determination. In consideration of this point, in a specific example, a simple preferential deletion flag is employed.

Figure 10:
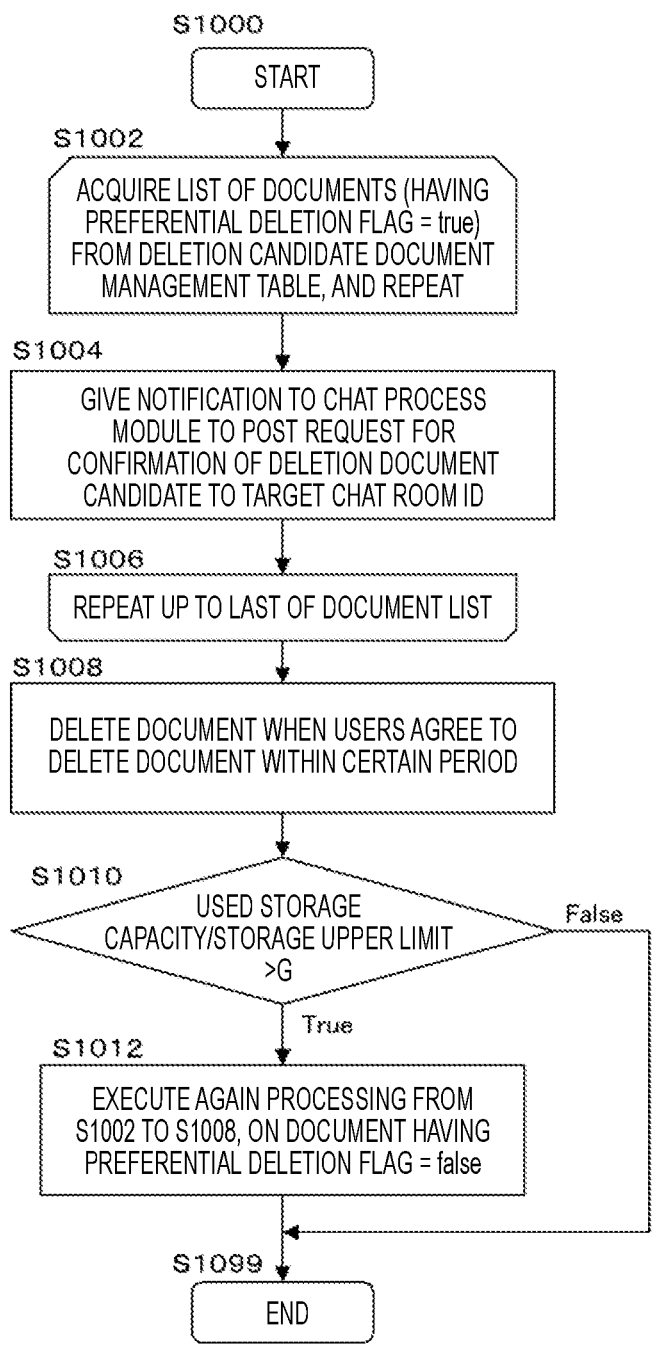
FIG. 10 is a flowchart illustrating an example of processing by the exemplary embodiment (a document deletion module)

FIG. 10 is a flowchart illustrating an example of processing by the exemplary embodiment (the document deletion module 150). Upon receipt of the notification from the extraction module 148, the document deletion module 150 performs this processing.

In step S1002, a list of documents having "preferential deletion flag=true" is acquired from the deletion candidate document management table 800, and processing is repeatedly performed up to step S1006.

In step S1004, a notification is given to the chat process module 142 to post a request for confirmation of a deletion document candidate to a target chat room ID.

The notification is given to the chat process module 142 to post following contents to the target chat room ID.

a document name of the deletion candidate document if the document may be deleted, information indicating asking for a predetermined reaction when the number of chat room users who made reactions indicating agreement to deletion reaches a threshold value H % by a due date, information indicating that the document will be deleted (the threshold value H is a freely selected value, and may be, for example, 0.8)

An example of a talk that is the notification will be described later with reference to FIG. 11.

In step S1006, processing in steps S1002 to S1004 is repeatedly performed up to the last of the document list.

In step S1008, when the users agree to delete the document within a certain period, the document is deleted. The certain period is a period freely selected, and may be, for example, one week or the like.

In the illustrated example, the document is deleted when the ratio of agreements (=the number of users who agreed/the total number of chat users of the chat room) is equal to or greater than a predetermined ratio. Alternatively, the document may be deleted when one user agreed, or the document may be deleted when the number of people who agreed is equal to or greater than a predetermined number.

In step S1010, it is determined whether "used capacity/storage upper limit >G" is satisfied. When it is determined that "used capacity/storage upper limit >G" is satisfied, the process proceeds to step S1012; otherwise, the process is ended (step S1099). The threshold value G is a value freely selected, and may be, for example, 0.5.

FIG. 11 is a view illustrating an example of processing by the exemplary embodiment. FIG. 11 illustrates an example of the talk which is the notification made in step S1004.

A talk 1110 is displayed in a chat room area on a screen 1100.

In the talk 1110, a confirmation request sentence 1120, a response icon (like) 1130, and a deletion document candidate 1140 are displayed. The deletion document candidate 1140 corresponds to the "document name of the deletion candidate document". A link to the document may be attached so that the document can be viewed. The response icon (like) 1130 is the "predetermined reaction". Selecting the response icon (like) 1130 by a chat user indicates that the chat user agrees to delete the deletion document candidate 1140. The icon of the response icon (like) 1130 is a response icon originally provided in the chat service. The response icon (like) 130 is used as an icon indicating agreement to deletion in the exemplary embodiment.

In the confirmation request sentence 1120, for example, "The consumption capacity of the document storage has reached 80%. The document capacity of the following document exceeds 1 GB. If there is no problem with deleting this document in order to free up the storage capacity, please press the "like button" to make a reaction When 80% of members make reactions by Sep. 30, 2020, the document will be deleted "is displayed".

In the description on the exemplary embodiment, as talk attributes used for determining whether to delete a document, (1) the number of reply talks made for a target talk, (2) the number of participants in talks including replies made for the talk, and (3) the number of reactions made for the talk are used. Alternatively, the following attributes may be used. Depending on a chat system, a document may be fixed to a chat room. For example, the document may be pinned at the upper portion of the chat room such that the document can be always viewed. Such a document may not be set as a deletion target.

In relation to a talk associated with the document,

The number of characters of the talk

The number of reply talks for the talk per unit time

The number of users who set the talk as a favorite.

Specifically, in step S904 in the flowchart illustrated in the example of FIG. 9, any one of conditions including "the number of characters of the talk <threshold value I", "the number of reply talks for the talk per unit time <threshold value J", and "the number of users who set the talk as a favorite <threshold value K" or a combination of plural conditions may be added, or may be replaced.

In the comparison process in the description of the exemplary embodiment, "equal to or greater than", "equal to or less than", "greater than", and "less than" are mere examples, and may be "greater than", "less than", "equal to or greater than", and "equal to or less than", respectively, unless a contradiction occurs in the combination.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The described program may be provided while being stored in a recording medium, or the program may be provided via a communication unit. In such a case, for example, the above described program may be regarded as an invention of a "computer-readable recording medium having a program recorded therein".

The "computer-readable recording medium having a program recorded therein" refers to a computer-readable recording medium having a program recorded therein, which is used for installing, executing, and distributing the program.

Examples of the recording medium may include a digital versatile disc (DVD), for example, "DVD-R, DVD-RW, DVD-RAM, etc." which are standards established in a DVD forum, and "DVD+R, DVD+RW, etc." which are standards established in DVD+RW, a compact disc (CD), for example, a read-only memory (CD-ROM), a CD recordable (CD-R), a CD rewritable (CD-RW), etc., a Blu-ray (registered trademark) disc, a magneto-optical disc (MO), a flexible disc (FD), a magnetic tape, a hard disk, a read-only memory (ROM), an electrically erasable programmable read only memory (EEPROM (registered trademark)), a flash memory, a random access memory (RAM), an secure digital (SD) memory card and the like.

Then, the whole or a part of the above program may be stored or distributed while being recorded in the above recording medium. The program may be transmitted through a communication, for example, using a wired network, or a wireless communication network used for a local area network (LAN), a metropolitan area network (MAN), a wide area network (WAN), the Internet, an intranet, an extranet and the like, or using a transmission medium having a combination of these. Also, the program may be carried on a carrier wave.

The above program may be a part or the whole of another program, or may be recorded in a recording medium together with a separate program. The program may be dividedly recorded in plural recording media. The program may be recorded in any manner such as compression or encryption as long as the program is restorable.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
   determine whether an amount of storage capacity currently used by a chat room relative to a storage capacity that is allocated to the chat room exceeds a predetermined threshold;
   in response to determining that the amount exceeds the predetermined threshold, extract a deletion target document associated with the chat room;
   in response to extracting the deletion target document, post a new message to the chat room, the message including (i) an auto-generated sentence requesting confirmation from participants in the chat room and (ii) an identifier of the deletion target document;
   receive reactions to the posted message from the participants in the chat room; and
   in a case where a number of predefined reactions, among the received reactions, exceeds a predetermined value, delete the deletion target document, wherein the predetermined reactions indicate agreement to the deletion.

2. The information processing apparatus according to claim 1, wherein
   the auto-generated sentence is a sentence asking the participants in the chat room whether they agree to delete the extracted deletion target document; and
   the identifier of the deletion target document is a name of the deletion target document.

3. The information processing apparatus according to claim 1, wherein
   the received reactions include a selection of an icon provided in the chat room.

4. The information processing apparatus according to claim 1, wherein
   the processor is configured to, in extracting the deletion target document,
      extract first-stage deletion target documents using attributes of the-documents associated with the chat room, and
      further extract the deletion target document from among the first-stage deletion target documents, using attributes of messages posted to the chat room in association with the first-stage deletion target documents.

5. The information processing apparatus according to claim 4, wherein the processor is configured to
   extract the first-stage deletion target documents when the storage capacity allocated to the chat room and the amount of the currently used storage capacity satisfy a predetermined condition.

6. The information processing apparatus according to claim 4, wherein
   the attributes of the messages posted to the chat room in association with the first-stage deletion target documents include a number of reply messages posted in response to a respective one of the first-stage deletion target documents, a number of participants in the chat room that have posted a reply message to the respective one of the first-stage deletion target documents, and a number of reactions made for the respective one of the first-stage deletion target documents.

7. The information processing apparatus according to claim 6, wherein
   the processor is configured to, when each of the attributes of the messages posted to the chat room in association with a certain first-stage deletion target document satisfies a corresponding preset condition, delete the certain first-stage deletion target document without inquiring the participants in the chat room.

8. An information processing method comprising:
   determining whether an amount of storage capacity currently used by a chat room relative to a storage capacity that is allocated to the chat room exceeds a predetermined threshold;
   in response to determining that the amount exceeds the predetermined threshold, extracting a deletion target document associated with the chat room;
   in response to extracting the deletion target document, posting a new message to the chat room, the message including (i) an auto-generated sentence requesting confirmation from participants in the chat room and (ii) an identifier of the deletion target document;
   receiving reactions to the posted message from the participants in the chat room; and
   in a case where a number of predefined reactions, among the received reactions, exceeds a predetermined value, deleting the deletion target document, wherein the predetermined reactions indicate agreement to the deletion.

9. A non-transitory computer readable medium storing a program that causes a computer to execute information processing, the information processing comprising:
   determining whether an amount of storage capacity currently used by a chat room relative to a storage capacity that is allocated to the chat room exceeds a predetermined threshold;
   in response to determining that the amount exceeds the predetermined threshold, extracting a deletion target document associated with the chat room;
   in response to extracting the deletion target document, posting a new message to the chat room, the message including (i) an auto-generated sentence requesting confirmation from participants in the chat room and (ii) an identifier of the deletion target document;
   receiving reactions to the posted message from the participants in the chat room; and
   in a case where a number of predefined reactions, among the received reactions, exceeds a predetermined value, deleting the deletion target document, wherein the predetermined reactions indicate agreement to the deletion.

* * * * *